March 24, 1964  R. D. LEGGETT ETAL  3,126,323
NUCLEAR REACTOR FUEL MEMBERS
Filed April 19, 1956

INVENTORS
Robert D. Leggett
Robert K. McGeary
and Eber K. Halteman
BY
Frederick Shapoe
ATTORNEY

United States Patent Office 3,126,323
Patented Mar. 24, 1964

3,126,323
NUCLEAR REACTOR FUEL MEMBERS
Robert D. Leggett, Robert K. McGeary, and Eber K. Halteman, Pittsburgh, Pa., assignors to Westinghouse Electric Corporation, East Pittsburgh, Pa., a corporation of Pennsylvania
Filed Apr. 19, 1956, Ser. No. 579,325
6 Claims. (Cl. 176—70)

This invention relates to uranium base alloy members, such members being particularly suitable for use as fuel elements in nuclear reactors, both alone and clad with protective zirconium alloys.

While it has been proposed heretofore to prepare fuel elements for nuclear reactors from uranium base alloys comprising substantial amounts of molybdenum, niobium, or both, the alloys being of the gamma phase structure, the corrosion resistance of these alloys when exposed to water and steam is relatively moderate. Consequently, such alloys will have a short life when the alloy is in direct contact with hot water or steam at temperatures of, for example, 650° F. It would be highly desirable to have available similar gamma phase alloys with a substantial increase in corrosion resistance to water and steam under these conditions.

It has been proposed heretofore to place uranium fuel elements within protective containers of aluminum, stainless steel, zirconium, and the like. Such protective cladding of the uranium fuel elements has not been perfect and completely reliable by reason of the possible presence of leaks, fissures or microscopic cracks therein which will admit high temperature water to the uranium fuel elements. The corrosion of the uranium will be rapid and may cause swelling of the clad elements and thereby result in a failure or other unsatisfactory reactor operation. In some instances, the clad elements have actually ruptured and introduced large amounts of radioactive components into the water or steam with highly undesirable results. In many cases the clad fuel elements have survived only about an hour in 650° F. water after the water penetrated through a crack or fissure in the cladding.

It is desirable to have available as a fuel element for a nuclear reactor a clad member which, even though the cladding is not completely impervious or perfect, will have a greatly reduced rate of corrosion of the uranium or alloy core so that there is a reasonable certainty that the fuel elements will have a certain minimum life of the order of 125 days in water at 650° F. even if the uranium alloy is exposed to water through the cladding from the beginning of life. Cladding applied to uranium fuel elements heretofore has not been sufficiently reliable or effective to assure in all cases such life for the fuel elements.

It will be understood further that the protective cladding must not exceed a certain proportion of the size or volume of the uranium fuel element proper otherwise the reactor properties are rendered greatly inferior. Consequently, there are limitations as to the amount or thickness of cladding that may be applied reasonably to a fuel element.

The object of the present invention is to provide a member suitable for use as a fuel element in a nuclear reactor comprising certain uranium base alloys embodying molybdenum, niobium or both, and a small proportion of platinum to provide high corrosion resistance and a long life when in contact with water.

A further object of the invention is to provide a clad fuel element comprising a core composed of gamma phase uranium alloy of uranium, molybdenum, or niobium, or both molybdenum and niobium and platinum, and a thin metallurgically bonded cladding layer of a specific zirconium-tin alloy.

Other objects of the invention will, in part, be obvious and will, in part, appear hereinafter.

For a better understanding of the nature and objects of the invention, reference should be had to the following detailed description and drawing, in which.

Figure 1:
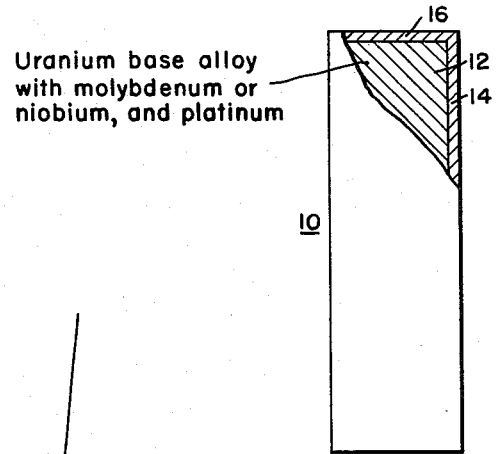
FIGURE 1 is a view in elevation, partly in section, of a clad member.

In accordance with the present invention, highly corrosion resistant gamma phase alloy members are produced by alloying uranium and at least one element selected from the group consisting of molybdenum and niobium, the total being from 3 to 18% by weight, and platinum in amounts of from 0.3% to 5% by weight. Particularly good results have been obtained when the total of molybdenum or niobium, or both, is in the range of 5% to 12% by weight and the platinum is present in amounts of from 0.5% to 2% by weight.

These platinum containing alloys may be readily prepared as members which contain the body centered cubic crystal structure, commonly designated as the gamma phase structure, which are highly resistant to corrosion in high temperature water and steam, and are stable to radiation under reasonably expected nuclear reactor conditions. These alloys may be readily melted, cast, and fabricated into plates, rods, wire and similar structural shapes with a relatively stable gamma phase under reasonable reactor conditions. The gamma phase transforms slowly even at elevated temperatures by an order-disorder reaction to the epsilon phase which is a slightly tetragonal modification, which is equally desirable in reactor fuel elements. Both the gamma phase structure and the epsilon phase structure is not subject to appreciable or irregular change of shape during use in reactors where these elements may be exposed to temperatures of 650° F. and higher.

More particularly, the alloys of the present invention are prepared by arc melting uranium, molybdenum or niobium, or both, and the platinum in a water cooled copper crucible or similar apparatus in an inert atmosphere employing non-consumable tungsten or molybdenum tipped electrodes. The uranium may be either natural uranium, or enriched uranium containing, for example, 10% and more of uranium 235. The uranium may contain small amounts of impurities such as carbon, nitrogen, silicon and the like, the total ordinarily not exceeding 500 parts per million. Usually, the uranium contains approximately 200 parts per million total impurities. The melt from the arc furnace may be cast into a graphite mold to produce an ingot of relatively small diameter. The ingot may be relatively non-uniform in distribution of the alloying components and, consequently, it is desirable to employ this ingot as a consumable electrode in a second arc melting process to produce a substantially larger ingot which will have much more uniform composition throughout.

The ingots whether arc melted or otherwise produced into a suitable uniform cast member may be fabricated by metal working procedures into bars, sheets, wire and other desirable members. Good results have been obtained by extruding billets of the alloy after heating them in salt baths at temperatures of from 1700° F. to 2100° F., and then extruding the heated billets in a conventional extruding press. Suitable lubricants for the extruding operation comprise glass. Rod of a diameter of 0.5 inch has been readily extruded from billets having a diameter of 2.4 inches. Press forging of billets heated to 1950° F. is a satisfactory method of producing desirable shapes of members. Hot rolling is satisfactory in producing flat plates of the alloy.

After the uranium alloy members have been prepared by suitable hot-working technique to the desired shape, the members are preferably given a homogenizing anneal by reheating to a temperature in the gamma field for several hours, and quickly cooled to room temperature. A suitable process we have used comprises heating to approximately 900° C. and higher for 12 to 24 hours and then water quenching. Water quenching has proven quite satisfactory in producing a member in which the entire structure is of the gamma phase. In some instances, air cooling the member from 900° C. to room temperature in one or two hours has resulted in the gamma phase structure being present throughout.

It has been found that improvement in corrosion resistance is obtained if the homogenized annealed member of the uranium alloy is further annealed within a temperature range of from 350° C. to 525° C. for at least seven days. The lower temperatures are applied to the alloys having the lower proportions of molybdenum and niobium. In particular, alloys containing from 11% to 13% molybdenum and niobium are annealed within a temperature range of 350° C. to 450° C. for a period of time of from 7 to 35 days with improvements in overall properties and a marked increase in corrosion resistance. The alloys with 14% to 16% molybdenum and niobium are preferably annealed at 500° C. and higher. We have found that the annealing at temperatures of 500° C. and higher produces optimum benefits within 5 to 10 days. Annealing for materially longer times does not produce any improvement.

The presence of the platinum in the proportions given greatly improves the corrosion resistance of the uranium base alloys containing molybdenum and/or niobium. Thus, members were prepared from a uranium alloy containing 10% niobium. The members were heated above 900° C. to homogenize the alloy and then quenched to retain the gamma phase. When placed in water at 650° F. the initial 7 day corrosion rate for the alloy was 0.06 milligram per square centimeter per hour. Similar members were also fabricated from an otherwise similar alloy containing 10% niobium and 1% platinum. The members were homogenized and quenched to retain the gamma phase in the same way. In water at 650° F., the corrosion rate was 0.01 milligram per square centimeter per hour. Consequently, the corrosion rate had been decreased by a factor of 6 by reason of the presence of the 1% of platinum.

Figure 2:
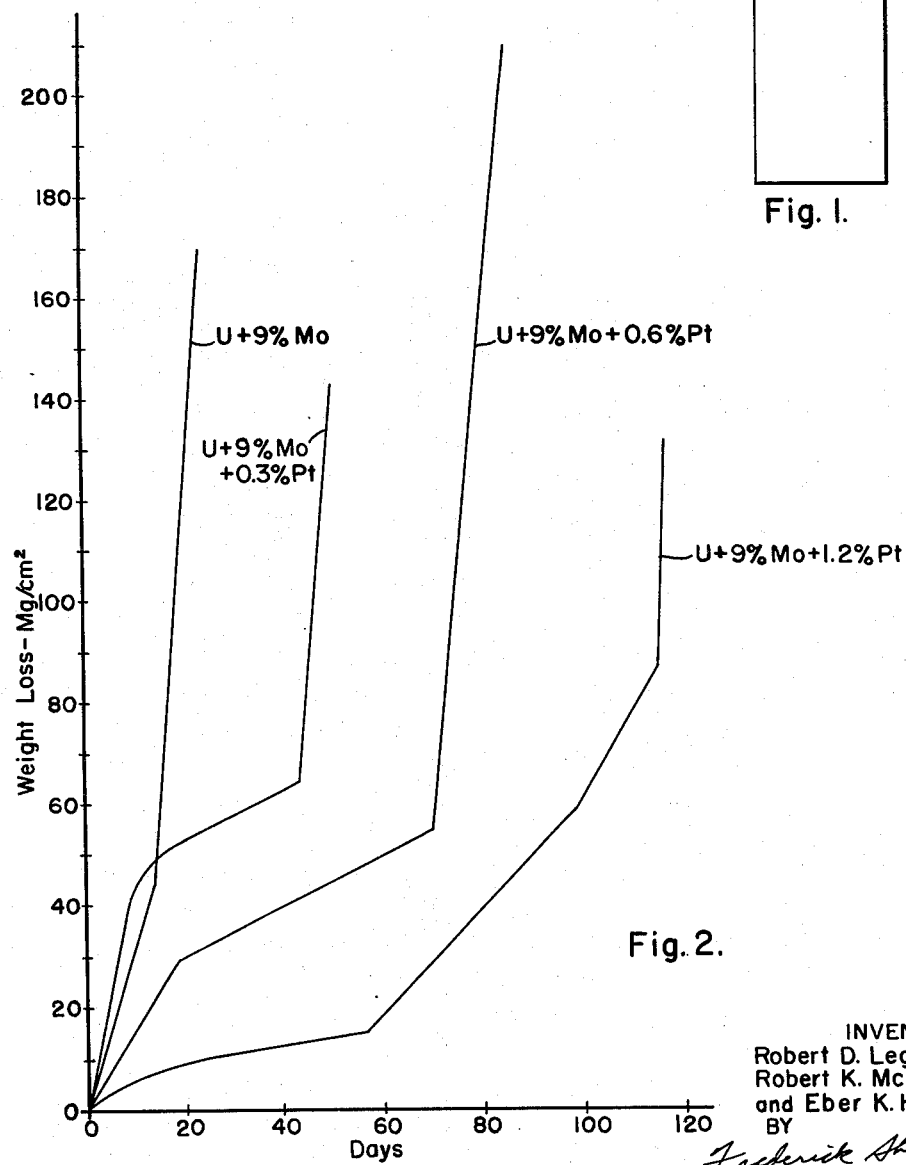
FIG. 2 is a graph plotting weight loss against days' immersion in hot water for members comprising the uranium alloys of this invention.

Referring to FIG. 2 of the drawing, there is illustrated curves plotted from test results obtained by subjecting to hot water at 650° F. a series of four alloys of uranium each containing 9% molybdenum and differing only in that the first alloy members had no platinum, the second alloy members contained 0.3% by weight of platinum, the third alloy members contained 0.6% by weight of platinum and the fourth alloy members contained 1.2% by weight of platinum. It will be quite apparent that the weight loss in milligrams per square centimeter of surface area, which corresponds to the corrosion of the members, was greatest for the member comprising only molybdenum and uranium. Test members of this first alloy had disintegrated in from 14 to 28 days. The members comprising 0.3% platinum had a substantially lesser corrosion rate. Furthermore, the members had not disintegrated until a period of from 42 to 56 days had passed. When 0.6% of platinum was present in the alloy, the corrosion rate was greatly decreased and the members had not disintegrated until an average period of 184 to 198 days had elapsed. The least corrosion was exhibited by the alloy containing 1.2% by weight of platinum.

Examples of ternary alloys in accordance with the invention are the following:

ALLOY I

| | Percent |
|---|---|
| Niobium | 2 |
| Molybdenum | 6 |
| Platinum | 0.6 |
| Uranium | Balance |

ALLOY II

| | |
|---|---|
| Niobium | 1 |
| Molybdenum | 7 |
| Platinum | 1.2 |
| Uranium | Balance |

These last two alloys will exhibit substantially improved corrosion resistance as compared to the same alloys without the platinum being present.

It has been found that as little as 0.3% platinum in an alloy comprising, for example, 9% molybdenum, the balance being uranium, lowers the corrosion rate by a factor of approximately 5 and will extend the life of members by about the same rate when exposed to high temperature water and steam. Alloys containing from 1.2% to 1.5% by weight of platinum have a corrosion rate that is decreased by a factor of 10 as compared to the same alloys without the platinum, all being subjected to high temperature water and steam.

While the uranium base alloys of the present invention containing platinum result in members having a markedly increased resistance to corrosion in water, it will be understood that even greater resistance to corrosion may be desirable when the members are employed in nuclear reactors. Consequently, it is highly desirable to prepare clad members of the alloy wherein the cladding promotes a prolonged life even under conditions wherein pin holes or other inadvertent imperfections are present in the cladding. It has been discovered that members of the alloys of the present invention may be employed in contact with hot water and steam for prolonged periods of time when they are clad with certain selected zirconium alloys.

The zirconium alloy employed for the cladding will consist essentially of from 0.1% to 2.5% by weight of tin, a total of from 0.1% to 2% by weight of at least one metal selected from the group consisting of iron, nickel, and chromium, less than 0.5% by weight of incidental impurities, and the balance being zirconium. It is desirable that these zirconium alloys contain less than 0.05% by weight of carbon. The zirconium may be pure zirconium or for certain purposes, it may be the natural metal which may contain up to 3% by weight of hafnium. For reactors, essentially pure zirconium will be used that contains not exceeding 0.05% by weight of hafnium.

Particularly good results have been secured from the zirconium alloy in which iron, nickel and chromium are all present in total amount not exceeding 2%. We have obtained excellent clad members by extruding alloys consisting of from 1.3% to 1.6% by weight of tin, from 0.05% to 0.16% by weight of chromium, 0.04% to 0.08% by weight of nickel, from 0.07% to 0.20% by weight of iron, less than 0.3% by weight of incidental impurities being present, and the balance being zirconium. The specific last-mentioned alloys were readily fabricated by both hot and cold forming operations into numerous types of members. In water or steam at temperatures of up to and including 750° F., the corrosion resistance was outstanding. A sample of annealed hot rolled strip within this last range of proportions had a 0.2% yield strength of 22,700 pounds per square inch in a tensile test conducted at 500° F., and a Rockwell B hardness of 91.

Particularly satisfactory zirconium alloys may comprise from 0.5% to 2.5% by weight of tin, from 0.05% to 1% by weight of chromium, from 0.05% to 0.5% by weight of nickel, and from 0.05% to 5% by weight of iron, the balance being zirconium.

The following examples illustrate zirconium alloys in accordance with the invention:

TABLE II.—TYPICAL ALLOY ANALYSES

| Alloy | Sn | Cr | Ni | Fe | $N_2$ |
|---|---|---|---|---|---|
| A | 0.7 | 0.7 | 0.4 | 0.2 | 0.004 |
| B | 1.0 | 0.5 | 0.25 | 0.15 | 0.004 |
| C | 1.2 | 0.3 | 0.2 | 0.15 | 0.005 |
| D | 1.5 | 0.1 | 0.05 | 0.12 | 0.006 |
| E | 1.8 | 0.05 | 0.05 | 0.10 | 0.008 |
| F | 2.0 | 0.05 | 0.05 | 0.06 | 0.01 |

The balance of each alloy was zirconium, and traces of incidental impurities. The carbon content of all of the above alloys was less than 0.05%.

It will be appreciated that various methods of producing the alloy may be employed. In one instance, for example, the alloy was prepared by initially melting zirconium in an arc melting furnace and then adding pellets prepared beforehand by alloying tin, iron, nickel and chromium in the desired proportions.

A series of alloys was prepared in which tin was maintained at 1.5%, the total of nickel, iron and chromium in nearly equal proportions being varied from 0.1% to 0.5%, the balance being zirconium and less than 0.2% of incidental impurities, and wrought strips of each of these alloys were tested in water at 680° F. for 98 days. The average corrosion in milligrams of absorbed oxygen per square decimeter of surface is about 160 when only traces of iron, nickel and chromium are present in the 1.5 tin-zirconium alloy. The corrosion rate in this test dropped from 48 at 0.05% total iron-nickel and chromium to 32 at 0.3% and then increased slowly to 38 at 0.5%. These data indicate a minimum rate of corrosion occurs in the zirconium-tin alloys having approximately 0.3% by weight of combined iron, nickel and chromium.

The following examples are illustrative of the invention:

*Example I*

A billet comprising 8% by weight of molybdenum, 1.02% by weight of platinum and the balance natural uranium was placed within a tube comprising a zirconium base alloy composed of 1.5% tin, 0.10% chromium, 0.12% iron and 0.06% nickel. The assembly was heated to 1700° F. and extruded as a round bar of a diameter of 0.30 inch. The zirconium alloy cladding had a wall thickness of 0.03 inch. The extruded bar was cut into lengths and discs of the same zirconium alloy were welded to the uranium alloy core and to the cylindrical cladding at each end to provide completely sealed cylindrical clad members. The extrusion had metallurgically bonded the zirconium alloy to the cylindrical surfaces of the uranium base alloy. The clad members were drilled to produce a hole of a diameter of 0.04 inch passing through the cladding and exposing the uranium alloy at one point. The members were then placed within an autoclave containing water at 650° F. The members withstood 210 days in the water without evidence of any failure due to corrosion. Members without the holes being present therein have a life in hot water and steam that is only limited by the ability of the cladding to withstand the effects of water.

*Example II*

An alloy was prepared from 12% molybdenum, 0.54% platinum and the balance being natural uranium. Billets of the alloy were clad with the zirconium alloy in the manner described in Example I. Clad members with holes drilled therein withstood over 210 days in water at 650° F. without exhibiting any failure due to corrosion.

Referring to FIG. 1 of the drawing, there is illustrated a clad member 10 produced in accordance with the present invention. The member 10 comprises a core 12 of the uranium base alloy comprising molybdenum or niobium or both, and a small amount of platinum to provide for a high corrosion resistance when exposed to water. Cladding 14 is metallurgically bonded to the sides of the core 12 by extrusion or other suitable process. Ends 16 comprising the zirconium base alloy may be applied by welding or other suitable procedures in order to completely enclose the core in the protective cladding material. The members 10 shown in FIG. 1 may be employed as fuel elements in nuclear reactors.

In the clad members as shown in FIG. 1, the zirconium alloy cladding appears to dissolve any nitrogen preferentially so that the uranium base alloy cannot react with hydrogen. Consequently, the uranium alloy cladding should be firmly bonded or welded to provide a metallurgical bond with the uranium alloy in order to provide the maximum protection. It will be understood that properly clad members may be prepared by rolling, extrusion or forging procedures. The hot working of the clad structure will result in a metallurgical bond between the cladding layer zirconium alloy and the uranium base alloy.

It will be understood that the members may be used in water and steam at any temperature besides those given above with low corrosion rates.

It will be understood that the above description and drawing are only illustrative of the invention.

We claim as our invention:

1. An alloy suitable for use as a fuel element in a nuclear reactor, said alloy composed of from 3% to 18% by weight of at least one element selected from the group consisting of molybdenum and niobium, from 0.3% to 5% by weight of platinum and the balance being uranium, the alloy being substantially all of gamma phase structure.

2. An alloy suitable for use as a fuel element in a nuclear reactor, said alloy composed of from 5% to 12% by weight of at least one element selected from the group consisting of molybdenum and niobium, from 0.5% to 2% by weight of platinum and the balance being uranium, the alloy being substantially all of gamma phase structure.

3. A clad member suitable for use as a fuel element in a nuclear reactor and highly resistant to corrosion when subjected to high temperature water and steam, the clad member comprising a core comprising an alloy composed of from 3% to 18% by weight of at least one element selected from the group consisting of molybdenum and niobium, from 0.3% to 5% by weight of platinum and the balance being uranium, the alloy being substantially all of gamma phase structure, and a cladding layer metallurgically bonded to the core, comprising an alloy consisting essentially of from 0.1% to 2.5% by weight of tin, from 0.1% to 2% by weight of at least one element selected from the group consisting of iron, nickel and chromium, and the balance being zirconium, with less than 0.5% of incidental impurities, the thickness of the cladding layer being at least 3% of the thickness of the core.

4. A clad member suitable for use as a fuel element in a nuclear reactor and highly resistant to corrosion when subjected to high temperature water and steam, the clad member comprising a core comprising an alloy composed of from 5% to 12% by weight of at least one element selected from the group consisting of molybdenum and niobium, from 0.5% to 2% by weight of platinum and the balance being uranium, the alloy being substantially all of gamma phase structure, and a cladding layer metallurgically bonded to the core, comprising an alloy consisting essentially of from 0.1% to 2.5% by weight of tin, from 0.1% to 2% by weight of at least one element selected from the group consisting of iron, nickel and chromium, and the balance being zirconium, with less than 0.5% of incidental impurities, the thickness of the cladding layer being at least 3% of the thickness of the core.

5. A clad member suitable for use as a fuel element in a nuclear reactor and highly resistant to corrosion when subjected to high temperature water and steam, the clad member comprising a core comprising an alloy composed of from 3% to 18% by weight of at least one element selected from the group consisting of molybdenum and niobium, from 0.3% to 5% by weight of platinum and the balance being uranium, the alloy being substantially all of gamma phase structure, and a cladding layer metallurgically bonded to the core comprising an alloy consisting essentially of from 0.5% to 2.5% tin, from 0.05% to 1% by weight of chromium, from 0.05% to 0.5% by weight of nickel, from 0.05% to 0.5% by weight of iron, carbon not exceeding 0.05%, and the balance being zirconium, with less than 0.5% of incidental impurities, the thickness of the cladding layer being at least 3% of the thickness of the core.

6. A member suitable for use as a fuel element in a nuclear reactor comprising a core comprising an alloy composed of from 3% to 18% by weight of at least one element selected from the group consisting of molybdenum and niobium, from 0.3% to 5% by weight of platinum and the balance being uranium, the alloy being substantially all of gamma phase structure, and a cladding layer covering substantially all of the core comprising an alloy consisting of from 1.3% to 1.6% by weight of tin, from 0.05% to 0.16% by weight of chromium, from 0.07% to 0.20% by weight of iron, from 0.04% to 0.08% by weight of nickel, not over 0.3% by weight of incidental impurities, and the balance being zirconium, the thickness of the cladding layer being equal to from 3% to 10% of the average thickness of the core.

No references cited.